March 21, 1950

G. K. McKEE 2,501,450

MACHINE TOOL TRANSMISSION

Filed June 29, 1945

INVENTOR.
GEORGE K. McKEE
BY
Joseph A. Rave
Attorney

March 21, 1950      G. K. McKEE      2,501,450
MACHINE TOOL TRANSMISSION
Filed June 29, 1945      3 Sheets-Sheet 2
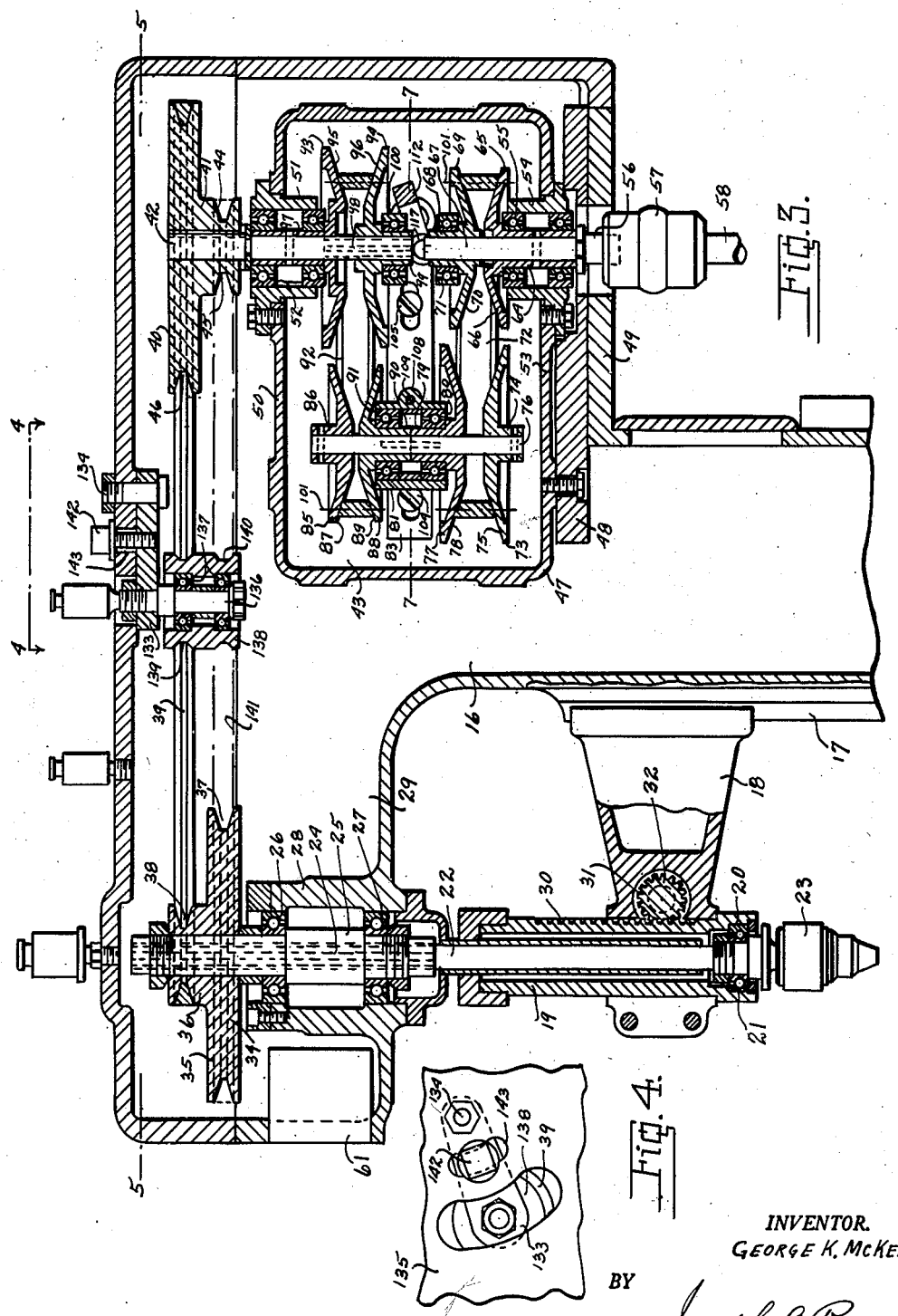
INVENTOR.
GEORGE K. McKEE
BY
Joseph A. Rave
Attorney

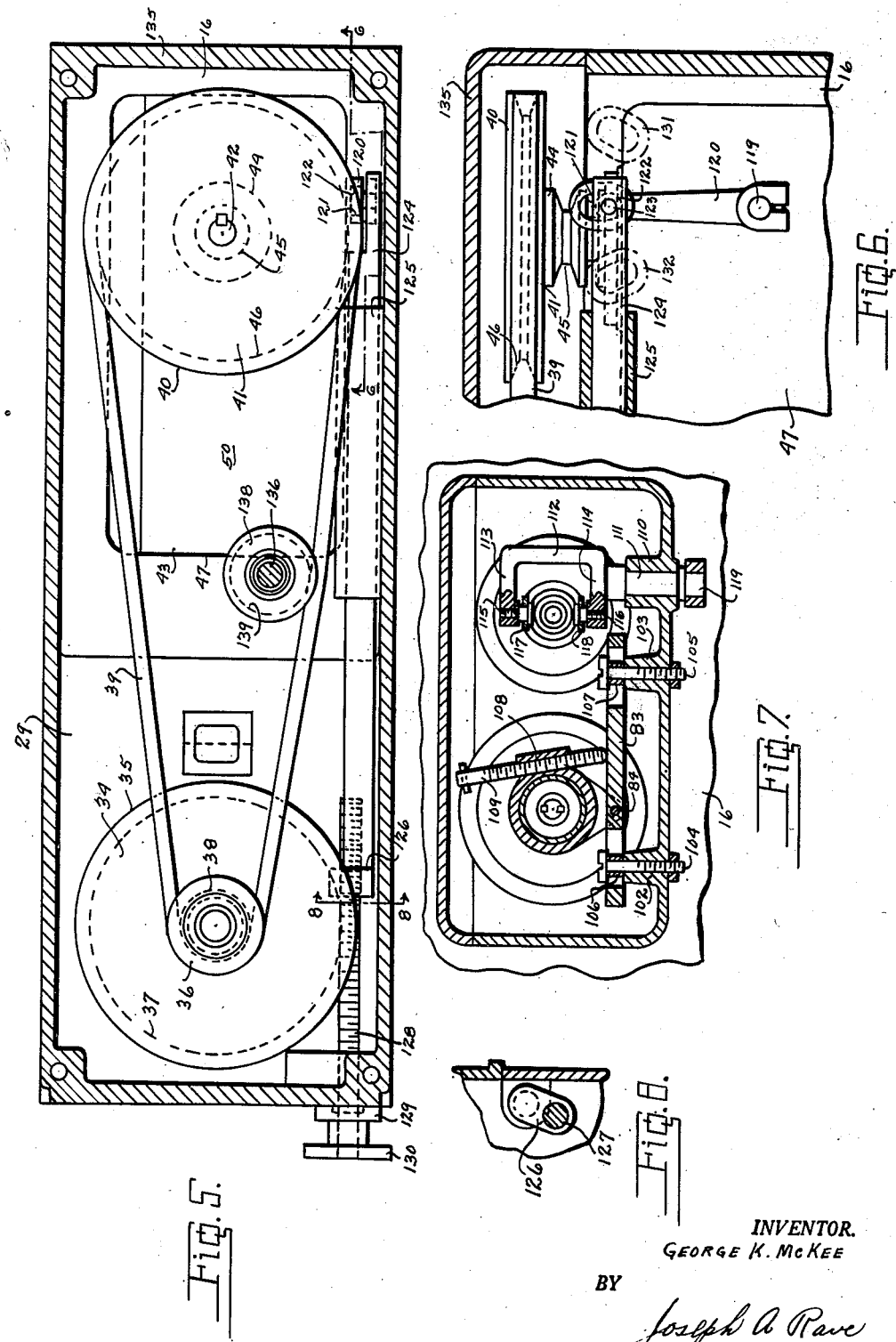

Patented Mar. 21, 1950

2,501,450

UNITED STATES PATENT OFFICE 2,501,450

MACHINE TOOL TRANSMISSION

George K. McKee, Cincinnati, Ohio, assignor to The Avey Drilling Machine Company, Covington, Ky., a corporation of Ohio Application June 29, 1945, Serial No. 602,288

4 Claims. (Cl. 74—230.17)

This invention relates to improvements in machine tools and particularly to improvements in drilling machines.

In drilling machines, particularly the so called "high speed" drilling machines, it is desirable to have a large range of drill speeds due to the fact that the diameter of drills and the kind of material to be drilled vary greatly. Drilling machines are frequently employed to effect tapping operations which again require different speeds from that of drilling and particularly a relatively slow speed to permit the tap to follow its lead while operating.

In the past numerous mechanical and hydraulic drives have been developed which answered, to a certain extent, the problem, but never fully solved it. By the present invention and as will later be made clear the disadvantages of the prior structures have been overcome and there is here provided a drilling machine whose spindle may be given a large number of different definite speeds ranging from 90 to 12000 revolutions per minute.

It is, therefore, the principal object of this invention to provide a drilling machine having drilling speeds through an unusually wide range.

Another object of this invention is the provision of a machine tool for accomplishing the foregoing object whose mechanism is relatively inexpensive to manufacture while being sturdy of construction.

Another object of this invention is the provision of a spindle drive for machine tools particularly drilling machines in which the speed of the drill can be readily changed without the necessity of employing change gears or in fact any gears which must be shifted through one another.

A specific object of this invention is the provision of a drilling spindle drive utilizing a change or variable speed mechanism wherein the variation is effected by minute steps with which is employed a two-step drive between the variable speed mechanism and spindle for thereby doubling the range of speeds to the spindle.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 3 is an enlarged fragmentary sectional view through the spindle and its drive taken on line 3—3 on Fig. 2.

Fig. 4 is a fragmentary plan view of certain of the parts illustrated in Fig. 3 as seen from line 4—4 on said Fig. 3.

Fig. 5 is a sectional plan view taken on line 5—5 on Fig. 3 and illustrating the connection between the spindle and variable speed mechanism.

Fig. 6 is a fragmentary view partly in section and partly in elevation as seen from line 6—6 on Fig. 5.

Fig. 7 is a fragmentary sectional view through the variable speed mechanism taken at right angles to the disclosure in Fig. 3 on line 7—7 on said Fig. 3.

Fig. 8 is a fragmentary sectional view through the variable speed adjusting mechanisms taken on line 8—8 on Fig. 5 and forming a detail of the invention.

Throughout the several views of the drawings similar reference characters are employed to denote the same or similar parts.

Figures 1, 2:
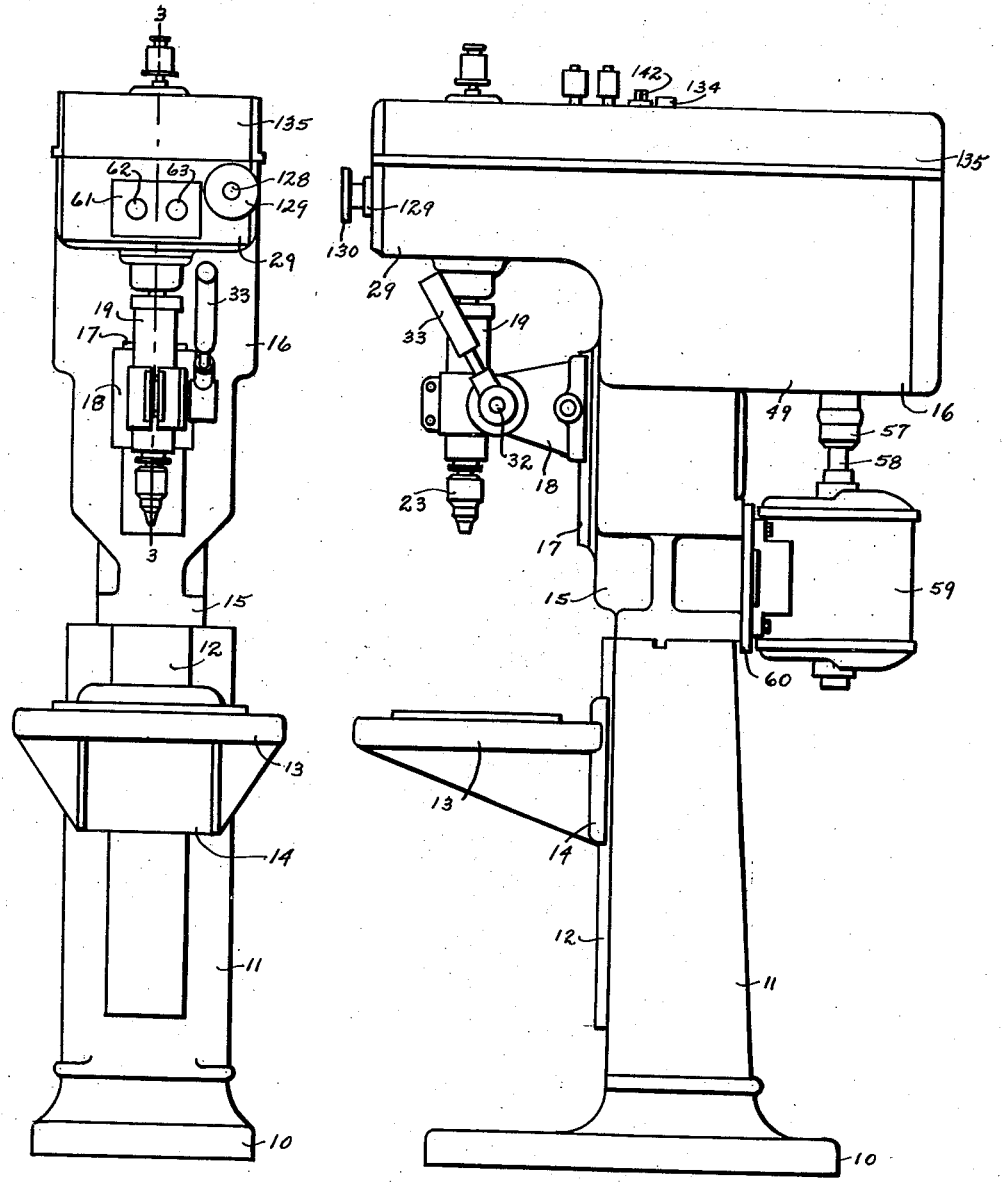
Fig. 1 is a side elevation of a drilling machine embodying the improvements of this invention.
Fig. 2 is a front elevation of the machine illustrated in Fig. 1 as seen from the left hand side thereof.

As was noted above this invention pertains to a spindle drive mechanism for the so called "high speed" drilling spindle, but it is to be understood that the invention is not limited exclusively to such an environment.

Referring to the drawings the machine illustrated comprises a base 10 from which rises the supporting column 11 having formed on its front face a dove-tailed guide or tongue. A work supporting table 13 is provided with a rear flange 14 having a dove-tailed guide-way therein for cooperating with the guide 12 and whereby the table 13 may be positioned relative to the column 11.

Mounted on the column 11 is the upper column 15 enlarged at its upper end to form a housing 16 in which is disposed the speed controlling mechanism to be subsequently described. The forward face of the column 15 is provided with a dove-tailed guide 17 received in a corresponding shaped guide-way formed in the bracket 18 which supports the drill spindle carrier or quill 19.

The construction and operation of the spindle carrier or quill 19 is relatively well known and as illustrated in Fig. 3 is in the form of a sleeve provided at its lower end with a counter bore 20 for the reception of an anti-friction or ball bearing 21 in which in turn is mounted the lower end of the spindle 22. The spindle 22 has removably secured to its lower end a tool or drill holding chuck 23 and is provided at its upper end with a splined portion 24 received in a driving sleeve 25.

The driving sleeve 25 is journaled in anti-friction or ball bearings 26 and 27 respectively carried by the upper and lower ends of a hollow boss 28 which projects into the overhanging portion 29 of the housing 16. It will be noted that the spindle 22 is mounted for independent rotation relative to the quill 19 but that the spindle and quill are mounted for unitary axial movement without disrupting the drive between the splined portion 24 of the spindle 22 and the driving sleeve 25. In order to effect the said axial movement of these parts the quill 19 is provided with a rack 30 meshing with rack pinion 31 integral with or secured to transverse shaft 32 mounted for rotation in the bracket 18. In order to rotate the shaft 32 and its pinion 31 the shaft, exteriorly of the bracket, is provided with a handle or layer 33.

The driving sleeve 25 above the hollow boss 28 has keyed or otherwise secured to it a two-step V-belt pulley indicated in general by reference numeral 34 and comprising larger pulley step 35 and smaller pulley step 36 respectively having a V-shaped groove 37 and 38. As illustrated in the drawings the smaller pulley 36 has passing therearound a V-belt 39 which in turn encircles the larger pulley 40 of a two-step V-belt pulley 41 keyed or otherwise secured to a shaft 42 at the other end of the housing 16.

The shaft 42 is the output shaft of a speed changing or variable speed mechanism indicated in general by reference numeral 43 and which mechanism, per se, does not form a part of this invention which is disclosed in principal in U. S. Patent No. 2,235,122 issued on March 18, 1941, to Louis E. Shaw, but this mechanism does form a part of this invention, in combination, as will later be pointed out in the claims. The two-step V-belt pulley 41 is provided with a second or smaller step 44 which has its V-shaped groove 45 in alinement with the groove of the larger step 35 of the pulley 34 and the groove 46 of the pulley step 40 is in alinement with the groove 38 of pulley step 36.

In general the variable speed mechanism 43 comprises a housing 47 secured to a slide 48 which is mounted on a rearwardly projecting ledge 49 of the housing 16. The housing 47, as seen in Fig. 3, has secured to its upper wall 50 a bearing sleeve or bushing 51 in which is mounted anti-friction or ball bearings 52 for journaling the out-put shaft 42. The lower wall 53 of the housing 47 has likewise secured to it a bearing sleeve or bushing 54 carrying anti-friction or ball bearings 55 in which is journaled a second short shaft or in-put shaft 56. The in-put shaft 56 is connected by a coupling 57 with a shaft 58 which is the motor shaft of the electric motor 59 secured through a slide 60 to the rear face of the upper column 15.

Mounted in the front end of the housing overhang 29 is a switch box 61 provided with the usual starting and stopping buttons 62 and 63 whereby the rotation of the motor 59 is controlled.

The input shaft 56 has pinned thereto a sleeve 64 having integral with its inner end a flange 65, the front face 66 of which flairs or tapers to form one side of a V-belt pulley which may be termed the driving pulley. Ahead of the flange 65 the in-put shaft 56 is provided with one or more keys 67 received in complementary splines in a sleeve 68 which has secured to its end adjacent the sleeve 64 a flange 69 whose face 70 oppositely flares or tapers to that of the face 66 of the flange 65. As seen in Fig. 3 it is the flared faces 66 and 70 which form the driving V-belt pulley. Mounted on the sleeve 68 behind the flange is an anti-friction or ball bearing 71 which, as will later be made clear constitutes an abutment for means for shifting the flange 69, and parts associated therewith, toward and from the flange 65 for thereby changing the width of the groove of the driving V-belt pulley.

Partially encircling the driving V-belt pulley is a V-belt 72 which in turn partially encircles a first intermediate V-belt pulley.

This intermediate V-belt pulley comprises a flange 73 having a sleeve 74 centrally thereof and having an inclined or tapered face 75. The flange 73 is pinned or otherwise secured to one end of an intermediate shaft 76. Opposed to the flange 73 is a flange 77 having a tapered or inclined face 78 in opposition to the face 75 of flange 73 and said faces 78 and 75 constituting V-belt pulley. Extending from the flange 77 is a sleeve 79 which is keyed to the intermediate shaft 76 so as to rotate therewith but adapted to have axial movement on said shaft. The sleeve 79 is journaled in an anti-friction or ball bearing 80 carried by a bushing 81 which, see Fig. 7, has projecting from opposite ends thereof ears 82 which straddle a slide bar 83 and through which ears 82 and slide bar 83 passes a bolt 84 which not only connects the parts to one another, but serves as a convenient pivotal mounting for the bushing 81 on the bar 83 for a purpose later to be made clear.

The intermediate shaft 76 has secured to its other end the second intermediate V-belt pulley substantially identical in all respects, with the construction of the first intermediate pulley which has just been described. The second intermediate V-belt pulley, therefore, comprises a flange 85 pinned through its sleeve 86 to the shaft 76 and having an inclined or tapered face 87. Opposed to the flange 85 is the flange 88 having the inclined or tapered face 89 and a sleeve 90. The sleeve 90 like the sleeve 79 is journaled in an anti-friction or ball bearing 91 carried by the bearing bushing 81 at its other end.

Partially encircling the second intermediate pulley is a V-belt 92 which in turn encircles a driven V-belt pulley on the out-put shaft 42. This driven pulley is constructed substantially identical with the construction of the driving pulley and comprises opposed pulley flanges 93 and 94 having opposed inclined faces 95 and 96 thereof forming the groove of the V-pulley. The flange 93 has projecting from it a sleeve 97 through which it is pinned on the out-put shaft 92 and through which sleeve the said shaft is journaled in the anti-friction or ball bearings 52. The out-put shaft 42 beyond the flange 93 is provided with keys 98 received in splines in the sleeve 99 projecting from the flange 94. Mounted on the sleeve 99 is an anti-friction or ball bearing 100 forming an abutment for means whereby the flange 94 may be actuated toward the flange 93.

From the foregoing it will be noted that flange 69 of the driving pulley is adapted to be shifted toward flange 65 while the flange 94 is adapted to be shifted toward the flange 93. The shifting of either of these flanges causes a diminishing of the transverse dimension of its V-groove thereby in effect increasing the effective diameter of the said pulley whose flange is actuated, the said effective diameter indicated by the broken line 101, toward the V-belt is increased the opposed intermediate pulley's effective diameter must be shortened which is caused by pulling the V-belt toward the axis of the shaft 76 and the shifting of the said shaft axially of the bushing. This intermediate shaft movement causes the remaining intermediate pulley to have its effective diameter increased and through its V-belt will cause the remaining driving or driven pulley to have its effective diameter reduced. From the foregoing it will be seen that the ratio between the driving and the driven pulley respectively on the in-put and out-put shafts can be varied between the minimum effective driving point and the maximum effective driving point of the driving pulley.

As the adjustment of the driving and driven pulleys takes place the distance between the axes of the co-axial in-put and out-put shafts and the intermediate shaft varies whereupon the slide bar 83, carrying the intermediate shaft 76 slides upwardly or downwardly, and to assist in this operation the back of the housing 47 has upstanding therefrom a pair of bosses 102 and 103 into which is let bolts or screws 104 and 105 supporting their heads and their respective bosses anti-friction rollers 106 and 107.

In order to properly tension the V-belts 72 and 92 advantage is taken of pivotal mounting of the bushing 81 wherefore it is provided with a lug 108 tapped to receive a screw 109 which bears on its inner end against the slide bar 83 and is provided on its outer end with a handle or the like to effect its rotation. The operation of this tensioning mechanism is believed obvious from Fig. 7 from which it will be noted that a downward screwing of the bolt 109 will cause a swinging movement of the bearing bushing 81 in a counter-clockwise direction thereby shifting the axis of the intermediate shaft 76 from the axis of the out-put shaft 42 and in in-put shaft 56.

In order to effect the adjustment of the pulley flange 69 toward its companion flange 55 and the shifting of pulley flange 94 toward its companion flange 93 use is made of the following mechanism. The back wall of housing 47 is provided with a bored bearing boss 110 in which is rotatably mounted a short shaft 111. Within the housing 47 the shaft 111 has integral therewith or secured thereto a yoke 112 having arms 113 and 114. Secured to the free ends of the arms 113 and 114 and extending toward one another are respectively headed studs 115 and 116 each supporting beneath its head a roller 117 and 118. The rollers 117 and 118 take up the space between the opposed anti-friction or ball bearings 71 and 100 and in fact each has its periphery at diametrical opposite points in contact with opposed faces of the outer races of the said ball bearings. From the foregoing it will be noted and by reference to Fig. 7 it will be seen that movement of the yoke about the axis of the shaft 111 toward the observer, or downwardly in Fig. 3 will cause the flange 69 to approach the flange 55 while the opposite movement of the said yoke will cause the rollers to move away from observer in Fig. 7 and upwards in Fig. 3 for shifting the flange 94 toward the flange 93. As was pointed out above this movement of each of these flanges causes the remaining one to shift oppositely with respect to its companion flange.

In order to effect the operation of the yoke 112, its shaft 111 projects beyond the housing as at 119 to which projection is secured the lower end of an arm 120, see Fig. 6. The arm 120 projects upwardly and is provided at its upper end with an elongated aperture 121 receiving therein a roller 122 connected by a stud 123 to the inner end of a bar 124. The bar 124 is mounted for sliding movement in a sleeve bearing 125 projecting inwardly of the housing 16 from the forward wall of the said housing. The other end of the bar 124 is provided with a downwardly and laterally projecting lug 126, see Figs. 5 and 8.

The lug 126 is in effect a nut provided with a tapped aperture 127 receiving adjusting screw 128. The adjusting screw 128 is mounted for rotative movement but not axial movement in the forward wall of the housing 16 as at 129. The screw 128 has a portion projecting beyond bearing 129 and to this projection is secured a knob 130 whereby the screw 128 is actuated.

Rotation of knob 130 in one direction causes the nut-lug to move to the right of the screw 129 as seen in Fig. 5 and thereby actuate the arm 120 in a counter-clockwise direction as seen in Fig. 6 while the reverse rotation of knob 130 reversely shifts the rod 124 and oscillates the arm 120 in a counter-clockwise direction. The limit of the oscillating movement of arm 120 is indicated by dotted lines 131 and 132 in Fig. 6.

From the foregoing it will now be noted that there has been provided a mechanism for rotating a tool spindle, particularly a drill spindle, through a large number of different speeds through a change speed mechanism which is relatively simple in construction, economical to produce and adjustable through a comparatively simple change speed adjusting mechanism. By providing the two-step V-belt drive between the spindle and change speed mechanism the range of spindle speeds is materially enhanced whereby all sizes of drills and taps may be employed and all kinds of material operated upon. As a matter of fact a drilling machine embodying mechanism here disclosed has been provided having drilling speeds between 90 to 12000 revolutions per minute.

It will be appreciated that the tension in the V-belt 39 must be maintained and for this purpose use is made of the belt tightening mechanism illustrated in Figs. 3 and 4. This mechanism comprises an arm 133 pivotally mounted at one end by bolt 134 to the underside of a cover 135 secured in the usual manner to the upper end of the housing 16. The outer end of the arm 133 has depending from it a stud 136 on which is mounted anti-friction or ball bearing 137 for journaling the idler pulley 138. The idler pulley 138 is provided with two relatively shallow V-shaped grooves 139 and 140 which are respectively arranged to have the groove 139 in alinement with the grooves 46 and 38 of pulley steps 40 and 36 when the belt 39 is in the position shown in full lines in Fig. 3 and with the groove 140 in alinement with the grooves 45 and 37 of pulley steps 44 and 35 when the belt 39 is in the phantom lines indicated by the reference numeral 141.

As seen in Fig. 4 the arm 133 is adapted to be actuated in a counter-clockwise direction around the pivot 134 to effect a belt tightening or tensioning and is adapted to be secured in its adjusted position by a clamping bolt 142 which is threaded into the arm 133 at a point intermediate its ends and passes through an arcuate aperture 143 in the cover 135 for drawing the said arm 133 against the under face of the said cover.

What is claimed is:

1. In a drilling machine of the class described the combination of an enclosing housing, a drilling spindle rotatably mounted in said enclosing housing, a variable speed unit comprising a housing mounted within the enclosing housing at a point removed from the spindle, an out-put shaft and an in-put shaft carried by the variable speed unit housing, adjusting speed means within the variable speed unit housing for adjusting the relative speeds of said in-put and out-put shafts, means within the variable speed unit housing operable through a lever exteriorly of said variable speed unit housing but interiorly of the enclosing housing for adjusting the adjusting speed means, means operable from the exterior of the enclosing housing for actuating the last mentioned means lever, including an axially shiftable bar connected with the lever, and an adjusting screw for effecting the axial shifting of the bar, and a transmission between the out-put shaft and the spindle comprising a V-belt pulley on each said out-put shaft and spindle with a V-belt therebetween.

2. In a drilling machine of the class described the combination of an enclosing housing, a drilling spindle rotatably mounted in said enclosing housing, a variable speed unit comprising a housing mounted within the enclosing housing at a point removed from the spindle, an out-put shaft and an in-put shaft carried by the variable speed unit housing, adjusting speed means within the variable speed unit housing for adjusting the relative speeds of said in-put and out-put shafts, means within the variable speed unit housing operable through a lever exteriorly of said variable speed unit housing but interiorly of the enclosing housing for adjusting the adjusting speed means, means operable from the exterior of the enclosing housing for actuating the last mentioned means lever, including an arm having an elongated aperture therein operatively connected with the lever, an axially shiftable bar having a roller thereon disposed in the arm aperture, and means for axially shifting the bar, and a transmission between the out-put shaft and the spindle comprising a V-belt pulley on each said out-put shaft and spindle with a V-belt therebetween.

3. In a drilling machine of the class described the combination of an enclosing housing, a drilling spindle rotatably mounted in said enclosing housing, a variable speed unit comprising a housing mounted within the enclosing housing at a point removed from the spindle, an out-put shaft and an in-put shaft carried by the variable speed unit housing, adjusting speed means within the variable speed unit housing for adjusting the relative speeds of said in-put and out-put shafts, means within the variable speed unit housing operable through a lever exteriorly of said variable speed unit housing but interiorly of the enclosing housing for adjusting the adjusting speed means, means operable from the exterior of the enclosing housing for actuating the last mentioned means lever, including an arm having an elongated aperture therein operatively connected with the lever, an axially shiftable bar having a roller at one end thereof disposed in the arm aperture and said bar having an internally threaded portion at the other end thereof, an adjusting screw threadedly engaging the internal threaded portion of the bar, and a knob for actuating the screw, and a transmission between the out-put shaft and the spindle comprising a V-belt pulley on each said out-put shaft and spindle with a V-belt therebetween.

4. In a drilling machine of the class described the combination of an enclosing housing, a drilling spindle rotatably mounted in said inclosing housing, a variable speed unit comprising a housing mounted within the enclosing housing at a point removed from the spindle, an out-put shaft and an in-put shaft carried by the variable speed unit housing, adjusting speed means within the variable speed unit housing for adjusting the relative speeds of said in-put and out-put shafts, means within the variable speed unit housing operable through a lever exteriorly of said variable speed unit housing but interiorly of the inclosing housing for adjusting the adjusting speed means, means operable from the exterior of the enclosing housing for actuating the last mentioned means lever, including an arm having an elongated aperture therein operatively connected with the lever, an axially shiftable bar having a roller at one end thereof disposed in the arm aperture and said bar having an internally threaded portion at the other end thereof, an adjusting screw threadedly engaging the internal threaded portion of the bar, and a knob for actuating the screw, and a transmission between the out-put shaft and the spindle comprising a two step V-belt pulley on each of said out-put shaft and spindle providing a pair of selectable transmissions each utilizable selectively by a common belt for transmitting the speed of the out-put shaft to the spindle.

GEORGE K. McKEE.

REFERENCES CITED

The following references are of record in the file of this patent:

UNITED STATES PATENTS

| Number | Name | Date |
|---|---|---|
| 2,078,859 | Lapham | Apr. 27, 1937 |
| 2,207,073 | Shields | July 9, 1940 |
| 2,209,484 | Tautz | July 30, 1940 |
| 2,248,948 | Bowers | July 15, 1941 |
| 2,296,573 | Richards | Sept. 22, 1942 |
| 2,342,604 | Shaw | Feb. 22, 1944 |